US009618367B2

(12) United States Patent
Seong et al.

(10) Patent No.: US 9,618,367 B2
(45) Date of Patent: Apr. 11, 2017

(54) CAPACITIVE SENSOR CIRCUIT (71) Applicants: Tan Siew Seong, Shenzhen (CN); Chua Tiong Kee, Singapore (SG)

(72) Inventors: Tan Siew Seong, Shenzhen (CN); Chua Tiong Kee, Singapore (SG)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 176 days.

(21) Appl. No.: 14/555,671

(22) Filed: Nov. 27, 2014

(65) Prior Publication Data
US 2015/0145527 A1 May 28, 2015

(30) Foreign Application Priority Data

Nov. 28, 2013 (CN) .......................... 2013 1 0624699

(51) Int. Cl.
G01R 27/02 (2006.01)
G01D 5/24 (2006.01)
(52) U.S. Cl.
CPC ..................................... G01D 5/24 (2013.01)
(58) Field of Classification Search
CPC ........ G01R 27/26; G01R 27/02; G01R 17/00; G01D 5/24
See application file for complete search history.

(56) References Cited

U.S. PATENT DOCUMENTS

| 5,210,475 | A | * | 5/1993 | Juzswik | H02H 7/0838 318/256 |
|---|---|---|---|---|---|
| 5,495,155 | A | * | 2/1996 | Juzswik | H02P 7/04 318/256 |
| 5,694,084 | A | * | 12/1997 | Sakurai | H03F 1/48 330/288 |
| 5,854,564 | A | * | 12/1998 | Darmawaskita | H03K 5/153 327/72 |
| 6,166,670 | A | * | 12/2000 | O'Shaughnessy | G05F 3/262 341/136 |
| 2004/0008058 | A1 | * | 1/2004 | Lee | G01D 5/24 327/58 |
| 2009/0295480 | A1 | * | 12/2009 | Ikeda | H03F 1/223 330/253 |
| 2010/0308906 | A1 | * | 12/2010 | Draxelmayr | G05F 3/262 327/581 |
| 2011/0157077 | A1 | * | 6/2011 | Martin | G06F 3/0418 345/174 |
| 2011/0169555 | A1 | * | 7/2011 | Draxelmayr | H03H 11/30 327/534 |

(Continued)

Primary Examiner — Huy Q Phan
Assistant Examiner — Alvaro Fortich
(74) Attorney, Agent, or Firm — Na Xu; IPro, PLLC (57) ABSTRACT A capacitive sensor circuit includes a sensor for providing a sensing voltage, a pre-processing circuit electrically connected to the sensor via an input connection line, and an impedance transformation circuit electrically connected between the input connection line and a bias point. The impedance transformation circuit includes a first impedance unit and a second impedance unit. The first impedance unit includes a first current mirror, and the second impedance unit includes a second current mirror configured as an invented matching current mirror of the first current mirror. The first current mirror is electrically connected to the input connection line, and the second current mirror is electrically connected to the bias point to receive a bias voltage.

14 Claims, 6 Drawing Sheets (56) References Cited

U.S. PATENT DOCUMENTS

2012/0025801 A1\* 2/2012 Hirose .................... G05F 3/242
　　　　　　　　　　　　　　　　　　　　　　323/313
2012/0286800 A1\* 11/2012 Maharyta .............. G06F 3/0416
　　　　　　　　　　　　　　　　　　　　　　324/603
2013/0266156 A1\* 10/2013 Frohlich ................... H03F 1/34
　　　　　　　　　　　　　　　　　　　　　　381/120

\* cited by examiner

CAPACITIVE SENSOR CIRCUIT

FIELD OF THE DISCLOSURE

The present disclosure generally relates to electronic circuit technologies, and more particularly, to a capacitive sensor circuit with high input impedance.

BACKGROUND

Capacitive sensor circuits are widely used in various consumer electronic products for realizing functionalities such as accelerometers, gyroscopes, microphones, or the like. In a typical capacitive sensor circuit, a pre-processing circuit (e.g., an amplifier or a buffer) is adapted and connected between a capacitive sensor and a load for amplifying or buffering a sensing signal of the capacitive sensor. The amplifier or the buffer needs to be biased in a normal operation voltage; however, a capacitance value of the capacitive sensor is normally is too low for the amplifier or the buffer.

A technique for solving the above-mentioned problem is to add an input resistor with high impedance to an input of the amplifier or the buffer. Nevertheless, the input resistor with high impedance normally occupies a large component area, which is intolerant in circuit design.

Another technique for solving the above-mentioned problem is to add a transistor pair coupled in a current mirror type arrangement to provide impedance transformations. However, in some instances, the current mirror not only has an undesired non-linear output but also brings even order distortion, which further produces rectifying effects that shift a direct current (DC) operating point of the amplifier or the buffer.

Accordingly, the present disclosure provides a capacitive sensor circuit to overcome the aforesaid problems.

BRIEF DESCRIPTION OF THE DRAWINGS

Many aspects of the embodiments can be better understood with reference to the following drawings. The components in the drawing are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

The present disclosure will be described in detail below with reference to the attached drawings and embodiments thereof.

Figure 1:
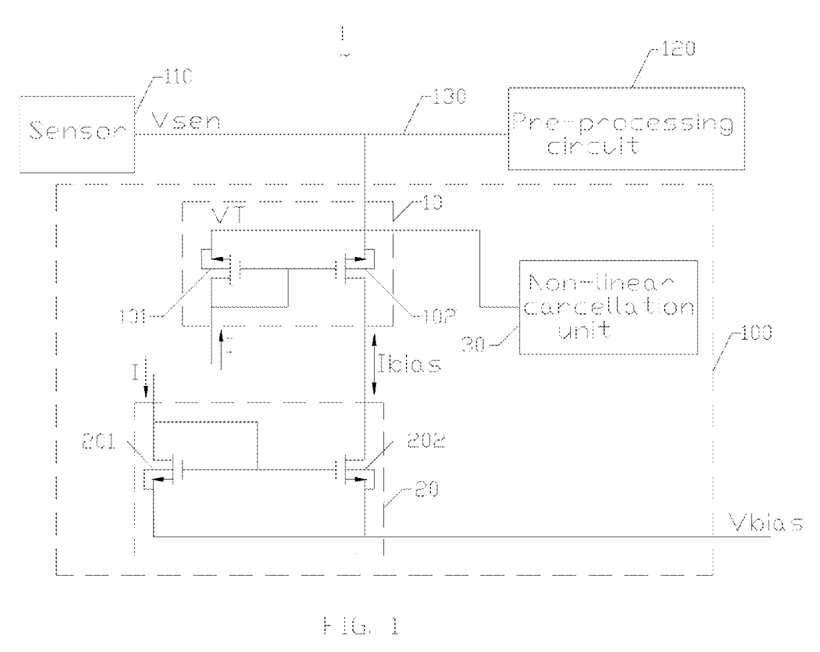
FIG. 1 is a circuit diagram of a capacitive sensor circuit according to a first exemplary embodiment of the present disclosure.

Referring to FIG. 1, a capacitive sensor circuit 1 according to a first exemplary embodiment of the present disclosure is shown. The capacitive sensor circuit 1 may be applied in an accelerometer, a gyroscope, or a microphone of an electronic device. As shown in FIG. 1, the capacitive sensor circuit 1 includes a sensor 110, a pre-processing circuit 120, and an impedance transformation circuit 100.

The sensor 110 is a capacitive sensor, such as a capacitive MEMS (micro-electro-mechanic system) sensor, and the sensor 110 is electrically connected to an input of the pre-processing circuit 120 via an input connection line 130. A sensing voltage Vsen output by the sensor 110 is transmitted to the pre-processing circuit 120 via the input connection line 130. The pre-processing circuit 120 is configured for performing pre-processing on the sensing voltage Vsen before the sensing voltage Vsen being output to a load (not shown). For example, the pre-processing circuit 120 may be an amplifying circuit which using an amplifier to amplify the sensing voltage Vsen; or a buffer for buffering the sensing voltage Vsen.

The impedance transformation circuit 100 is electrically connected to the input of the pre-processing circuit 120, and is configured for performing impedance transformation within the capacitive sensor circuit 1. In the illustrated embodiment, for example, the impedance transformation circuit 100 is electrically connected between the input connection line 130 and a bias point of the capacitive sensor circuit 1. The bias point is configured for providing a bias voltage Vbias to the impedance transformation circuit 100.

In the illustrated embodiment, the impedance transformation circuit 100 includes a first impedance transformation unit 10, a second impedance transformation unit 20, and a non-linear cancellation unit 30. The first impedance transformation unit 10 is electrically connected to the second impedance transformation unit 20, and the non-linear cancellation unit 30 is electrically connected between the pre-processing circuit 120 and the first impedance transformation unit 10.

Each of the first impedance transformation unit 10 and the second impedance transformation unit 20 employs a transistor pair coupled in a current mirror type arrangement. Specifically, the first impedance transformation unit 10 includes a first transistor 101 and a second transistor 102 which are coupled to each other to form a first current mirror; and the second impedance transformation unit 20 includes a third transistor 201 and a fourth transistor 202 which are coupled to each other to form a second current mirror. A circuit configuration of the first current mirror is substantially same as that of the second current mirror, and the second current mirror is electrically connected to the first current mirror so as to be an inverted matching current mirror of the first current mirror.

In one embodiment, the first transistor 101, the second transistor 102, the third transistor 103 and the fourth transistor 104 are N-type metal oxide semiconductor (NMOS) field effect transistor.

A gate of the first transistor 101 is electrically connected to a gate of the second transistor 102, and is further electrically connected to a drain of the first transistor 101. The drain of the first transistor 101 may receive a reference current I from an external circuit (not shown). A source of the first transistor 101 is electrically connected to the non-linear cancellation unit 30 to receive a reference voltage VT from the non-linear cancellation unit 30.

Optionally, the reference voltage VT provided by the non-linear cancellation unit 30 may be greater than the sensing voltage Vsen of the sensor 110. Alternatively, the reference voltage VT may be less than or equal to the sensing voltage Vsen.

A source of the second transistor 102 serves as an input of the impedance transformation circuit 100. The source of the second transistor 102 is electrically connected to the input connection line 130 between the sensor 110 and the pre-processing circuit 120, and the sensing voltage Vsen of the sensor 110 is used as an input voltage of the impedance transformation circuit 100. With this configuration, the source of the second transistor 102 may provide a connection point with low parasitic capacitance and high impedance for the impedance transformation circuit 100. Moreover, a drain of the second transistor 102 is electrically connected to a drain of the fourth transistor 202 of the second impedance transformation unit 20.

A gate of the third transistor 201 is electrically connected to a gate of the fourth transistor 202, and is further connected to a drain of the third transistor 201. The drain of the third transistor 201 may also receive the reference current I provided by the external circuit (not shown). A source of the third transistor 201 and a source of the fourth transistor 202 are electrically connected to each other, and are further electrically connected to the bias point to receive the bias voltage Vbias from the bias point.

In operation, the bias point may provide such a bias voltage that each of the first transistor 101, the second transistor 102, the third transistor 201 and the fourth transistor 202 of the second impedance unit 20 is enabled to operate in an sub-threshold region. Due to the reference current I, a bias current Ibias is generated between the first impedance unit 10 and the second impedance unit 20.

Figure 2:
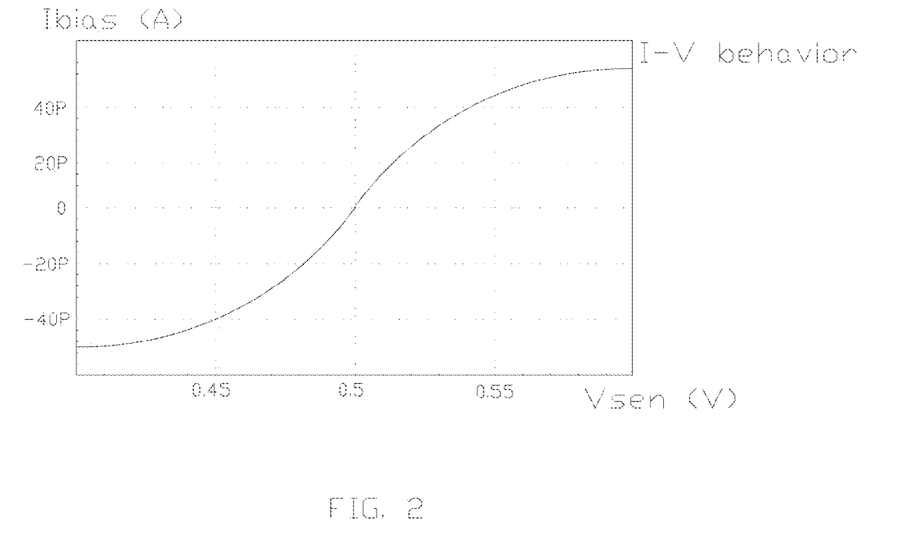
FIG. 2 illustrates current-voltage behavior of an impedance transformation circuit of the capacitive sensor circuit in FIG. 1.

FIG. 2 is a current-voltage (I-V) behavior curve of the impedance transformation circuit 100, which shows a relation between the bias current Ibias of the impedance transformation circuit 100 and the sensing voltage Vsen of the sensor 110. The I-V behavior curve may be obtained by performing a simulation under a condition that an output voltage of the non-linear cancellation unit 30 is approximately equal to a sensing voltage Vsen of the sensor 110.

From the I-V behavior curve as illustrated in FIG. 2, it can be found that an I-V behavior between the bias current Ibias of the impedance transformation circuit 100 and the sensing voltage Vsen of the sensor 110 is substantially symmetrical. Specifically, when the sensing voltage Vsen of the sensor 110 is low, the bias current Ibias of the impedance transformation circuit 100 is also low, and thus the impedance transformation circuit 100 is capable of providing a high input impedance for the pre-processing circuit 120; when the sensing voltage Vsen of the sensor 110 is high, the bias current Ibias of the impedance transformation circuit 100 is also high, and thus the impedance transformation circuit 100 can still provide a high input impedance for the pre-processing circuit 120.

In summary, with the above-mentioned configuration, the capacitive sensor circuit 1 as provided in the present embodiment can ensure the bias current Ibias of the impedance transformation circuit 100 and the sensing voltage Vsen of the sensor 110 have a linear relation. As such, the impedance transformation circuit 100 is capable of providing high input impedance for the pre-processing circuit 120 without being influenced by the sensing voltage Vsen of the sensor 110. This can mitigate the undesired non-linear behavior of the impedance transformation circuit 100, and depress the rectifying effects which may otherwise occur due to the even order distortion, and therefore, the pre-processing circuit 120 can be ensured to operate under a stable operation point.

Furthermore, in the capacitive sensor circuit 1 as provided in the present embodiment, because the first impedance unit 10 and the second impedance unit 20 are connected in an inverted matching current mirror manner, side effect of the impedance transformation circuit 100 can also be mitigated, and an overall component area can also be reduced.

Figure 3:
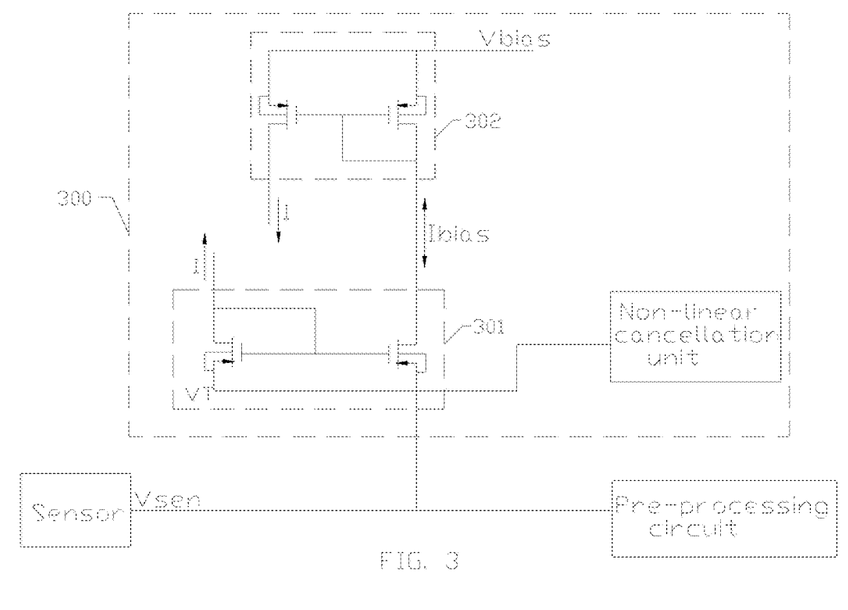
FIG. 3 is a circuit diagram of a capacitive sensor circuit according to a second exemplary embodiment of the present disclosure.

Referring to FIG. 3, a capacitive sensor circuit according to a second exemplary embodiment of the present disclosure is shown. The capacitive sensor circuit as illustrated in FIG. 3 is similar to the capacitive sensor circuit 1 in FIG. 1, for example, an impedance transformation circuit 300 of the capacitive sensor circuit in the present embodiment also includes a first impedance unit 301 and a second impedance unit 302, however, both of the first impedance unit 301 and the second impedance unit 302 use P-type MOS transistors to form current mirrors.

Figure 4:
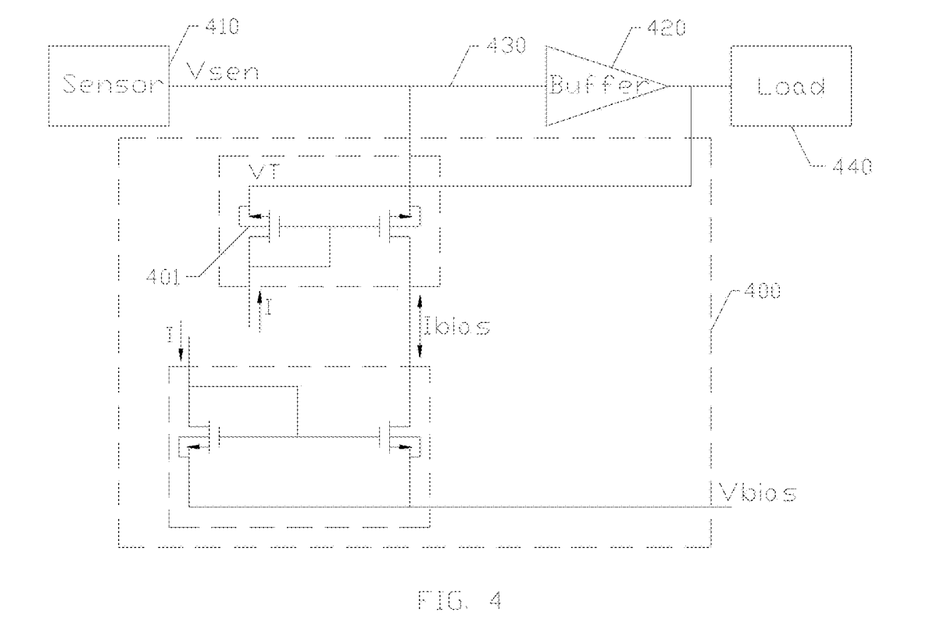
FIG. 4 is a circuit diagram of a capacitive sensor circuit according to a third exemplary embodiment of the present disclosure.

Referring to FIG. 4, a capacitive sensor circuit according to a third exemplary embodiment of the present disclosure is shown. The capacitive sensor circuit as illustrated in FIG. 4 is similar to the capacitive sensor circuit 1 in FIG. 1, for example, the capacitive sensor circuit in the present embodiment includes a sensor 410, a buffer 420, a load 440 and an impedance transformation circuit 400; the sensor 410 is electrically connected to an input of the buffer 420 via an input connection line 430, and an output of the buffer 420 is further electrically connected to the load 440; the impedance transformation circuit 400 is electrically connected between the input connection line 430 and a bias point for providing a bias voltage Vbias.

Moreover, the impedance transformation circuit 400 as illustrated in FIG. 4 may also have a circuit configuration similar to the impedance transformation circuit 100 as illustrated in FIG. 1; however, the impedance transformation circuit 400 does not include a non-linear cancellation unit for providing a reference voltage VT to a first impedance unit. Instead, in the impedance transformation circuit 400, a source of a first transistor 401 of the first impedance unit is directly connected to an output of the buffer 420; in other words, an output voltage of the buffer 420 is adapted as the reference voltage VT provided to the source of the first transistor 401 in this embodiment. Since an output voltage of the buffer 420 is obtained after a sensing voltage Vsen of the sensor 410 being buffered in the buffer 420, in the present embodiment, the reference voltage VT is substantially equal to the sensing voltage Vsen of the sensor 410.

Figure 5:
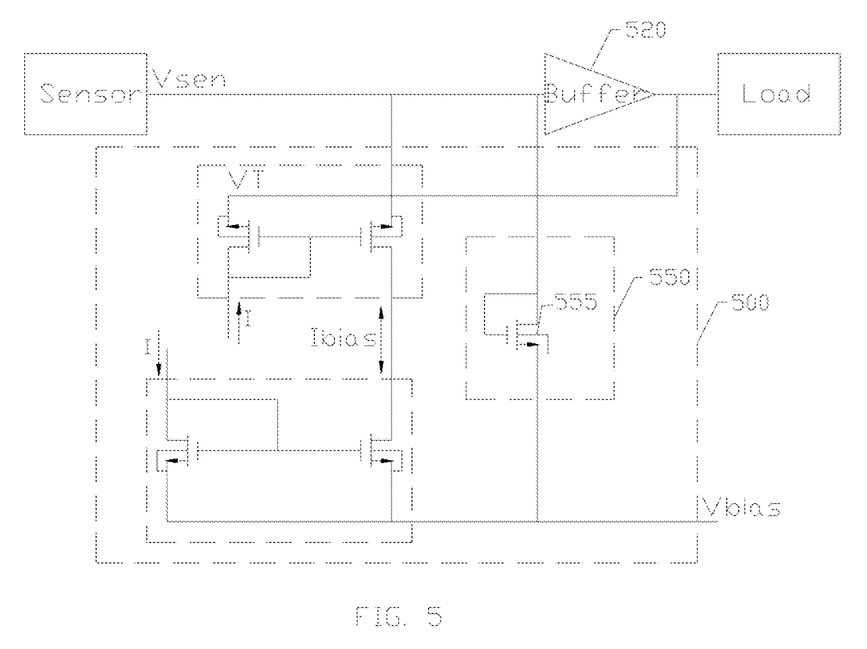
FIG. 5 is a circuit diagram of a capacitive sensor circuit according to a fourth exemplary embodiment of the present disclosure.

Referring to FIG. 5, a capacitive sensor circuit according to a fourth exemplary embodiment of the present disclosure is shown. The capacitive sensor circuit as illustrated in FIG. 5 is similar to the capacitive sensor circuit in FIG. 4, but differs in that an impedance transformation circuit 500 in FIG. 5 further includes a rapid stable circuit 550 between an input of a buffer 520 and a bias point. The rapid stable circuit 550 includes a transistor 555 which may also be an N-type MOS transistor. A gate of the transistor 555 is electrically connected to a drain of the transistor 555, and is further electrically connected to the input of the buffer 520, and a source of the transistor 555 is electrically connected to the bias point for receiving a bias voltage Vbias. In the present embodiment, the rapid stable circuit 550 is adapted to expedite stable time of a sensor and the buffer 520, which may be relatively long due to high input impedance.

Figure 6:
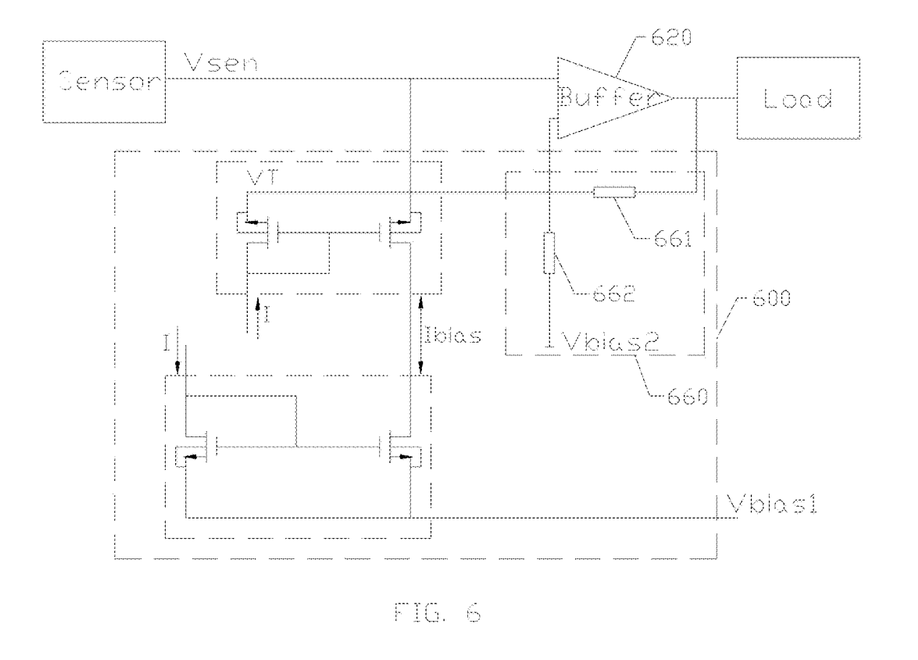
FIG. 6 is a circuit diagram of a capacitive sensor circuit according to a fifth exemplary embodiment of the present disclosure.

Referring to FIG. 6, a capacitive sensor circuit according to a fifth exemplary embodiment of the present disclosure is shown. The capacitive sensor circuit as illustrated in FIG. 6 is similar to the capacitive sensor circuit in FIG. 5, but differs in that an impedance transformation circuit 600 in FIG. 6 further includes a voltage-dividing circuit 660 between an output of a buffer 620 and a second bias point. Specifically, the voltage-dividing circuit 660 may serve as a non-linear cancellation unit in this embodiment, and includes a first resistor 661 and a second resistor 662 electrically connected in series. An end of the first resistor 661 is electrically connected to the output of the buffer 620, an end of the second resistor 662 is electrically connected to the second bias point to receive a second bias voltage Vbias2, and a node between the first resistor 661 and the second resistor 662 is electrically connected to a first transistor of a first impedance transformation unit. As such, a division voltage of the voltage-dividing circuit 660 is output to the first impedance transformation unit and serves as a reference voltage VT.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A capacitive sensor circuit, comprising:
   a sensor for providing a sensing voltage;
   a pre-processing circuit electrically connected to the sensor via an input connection line; and
   an impedance transformation circuit electrically connected between the input connection line and a bias point, the impedance transformation circuit comprising a first impedance unit and a second impedance unit;
   wherein the first impedance unit comprises a first current mirror, the second impedance unit comprises a second current mirror which is connected to the first current mirror and configured as an inverted matching current mirror of the first current mirror;
   wherein the first current mirror is electrically connected to the input connection line, and the second current mirror is electrically connected to the bias point to receive a bias voltage.

2. The capacitive sensor circuit of claim 1, wherein the first impedance transformation unit comprises a first transistor and a second transistor electrically coupled in a current mirror type arrangement for forming the first current mirror, the second impedance transformation unit comprises a third transistor and a fourth transistor which are also electrically coupled in a current mirror type arrangement for forming the second current mirror.

3. The capacitive sensor circuit of claim 2, the bias voltage is configured for enabling each of the first transistor, the second transistor, the third transistor, and the fourth transistor to operate in a sub-threshold region.

4. The capacitive sensor circuit of claim 2, wherein the first transistor, the second transistor, the third transistor, and the fourth transistor are all NMOS field effect transistors or PMOS field effect transistors.

5. The capacitive sensor circuit of claim 4, wherein a gate of the first transistor is electrically connected to a gate of the second transistor, and is further electrically connected to a drain of the first transistor; the drain of the first transistor is configured for receiving a reference current from an external circuit; a source of the first transistor is configured for receiving a reference voltage.

6. The capacitive sensor circuit of claim 5, wherein a source of the second transistor serves as an input point of the impedance transformation circuit, and is electrically connected to the input connection line; and a drain of the second transistor is electrically connected to the second impedance transformation unit.

7. The capacitive sensor circuit of claim 6, wherein a gate of the third transistor is electrically connected to a gate of the four transistor, and is further connected to a drain of the third transistor; the drain of the third transistor is also configured for receiving the reference current; and a source of the third transistor is electrically connected the bias point to receive the bias voltage.

8. The capacitive sensor circuit of claim 7, wherein a source of the fourth transistor is also electrically connected to the bias point to receive the bias voltage, and a drain of the fourth transistor is electrically connected to the drain of the second transistor.

9. The capacitive sensor circuit of claim 5, wherein the pre-processing circuit comprises a buffer for buffering the sensing voltage of the sensor, and an output of the buffer is electrically connected to the source of the first transistor.

10. The capacitive sensor circuit of claim 9, wherein the impedance transformation circuit further comprises a rapid stable circuit electrically connected between an input of the buffer and the bias point, the rapid stable circuit is configured for expediting stable time of the sensor and the buffer.

11. The capacitive sensor circuit of claim 10, wherein the rapid stable circuit comprises a fifth transistor, a gate of the fifth transistor is electrically connected to a drain of the fifth transistor, and is further electrically connected to the input of the buffer, and a source of the fifth transistor is electrically connected to the bias point for receiving the bias voltage.

12. The capacitive sensor circuit of claim 5, wherein the impedance transformation circuit further comprises a non-linear cancellation unit, the non-linear cancellation unit is electrically connected between the pre-processing circuit and the source of first transistor, and is configured for providing the reference voltage for the impedance transformation circuit.

13. The capacitive sensor circuit of claim 5, wherein the pre-processing circuit comprises a buffer for buffering the sensing voltage of the sensor, and the impedance transformation circuit further comprises a voltage-dividing circuit, the voltage-dividing circuit comprises a first resistor and a second resistor electrically connected in series; an end of the first resistor is electrically connected to an output of the buffer, an end of the second resistor is electrically connected to a second bias point to receive a second bias voltage, and a node between the first resistor and the second resistor is electrically connected to the source of the first transistor.

14. The capacitive sensor circuit of claim 1, wherein the pre-processing circuit comprises an amplifier for amplifying the sensing voltage of the sensor.

* * * * *